(12) United States Patent
Chow (10) Patent No.: US 8,545,011 B2
(45) Date of Patent: Oct. 1, 2013

(54) EYEGLASS WITH INTERCHANGEABLE ORNAMENTATION

(75) Inventor: Yee Ling Chow, Loveland, OH (US)

(73) Assignee: Luxottica Group S.p.A. (IT)

( * ) Notice: Subject to any disclaimer, the term of this patent is extended or adjusted under 35 U.S.C. 154(b) by 210 days.

(21) Appl. No.: 12/896,497

(22) Filed: Oct. 1, 2010

(65) Prior Publication Data

US 2011/0080555 A1 Apr. 7, 2011

Related U.S. Application Data

(60) Provisional application No. 61/248,401, filed on Oct. 2, 2009.

(51) Int. Cl.
*G02C 11/02* (2006.01)

(52) U.S. Cl.
USPC .............................. 351/52; 351/103; 351/111

(58) Field of Classification Search
USPC .................. 351/51–52, 57–58, 106, 111, 158
See application file for complete search history.

(56) References Cited

U.S. PATENT DOCUMENTS

| | | |
|---|---|---|
| 2,482,195 A | 9/1949 | Martin |
| 2,495,508 A | 1/1950 | Cleaver |
| 2,555,578 A | 6/1951 | Davis |
| 2,566,236 A | 8/1951 | Meddoff |
| 2,599,463 A | 6/1952 | Lamb |
| 2,609,278 A | 9/1952 | Eyles |
| 2,633,059 A | 3/1953 | Lindblom |
| 2,682,724 A | 7/1954 | Pattillo |
| 2,743,543 A | 5/1956 | Goddard |
| 2,752,713 A | 7/1956 | Franklin |
| 2,775,162 A | 12/1956 | Hipple |
| 2,778,136 A | 1/1957 | Belgard |
| 2,803,994 A | 8/1957 | De Angelis et al. |

(Continued)

FOREIGN PATENT DOCUMENTS

| | | |
|---|---|---|
| DE | 20303457 | 6/2003 |
| EP | 1860484 | 11/2007 |

(Continued)

OTHER PUBLICATIONS

International Search Report and Written Opinion in related International Application No. PCT/US2010/051203, dated Dec. 23, 2010 in 14 pages.

(Continued)

*Primary Examiner* — Thomas K Pham
*Assistant Examiner* — Vipin Patel
(74) *Attorney, Agent, or Firm* — Knobbe Martens Olson & Bear, LLP (57) ABSTRACT

An eyeglass component mounting system is provided that comprises an eyeglass and a decorative component that can be removably attached to the eyeglass, such as onto an earstem of the eyeglass. For example, the earstem can comprise a retention zone whereat the decorative component can be secured. In some embodiments, the retention zone comprises a recess and a magnetic retention element that can magnetically attract and secure the decorative component in an engaged position after being fitted into the recess. The engagement or attraction between the retention zone of the earstem and the decorative component can be maximized when the decorative component is in the engaged position in order to prevent accident or unintentional dislodgement of the decorative component.

20 Claims, 9 Drawing Sheets

(56) References Cited

U.S. PATENT DOCUMENTS

| | | |
|---|---|---|
| 2,825,267 A | 3/1958 | Gagnon |
| 2,835,063 A | 5/1958 | Worthington |
| 2,842,028 A | 7/1958 | Belgard |
| 2,868,073 A | 1/1959 | Rosen et al. |
| 2,922,238 A | 1/1960 | Neary |
| 2,960,787 A | 11/1960 | Quinones et al. |
| 3,021,753 A | 2/1962 | Vinson |
| 3,179,950 A | 4/1965 | Gross et al. |
| 3,517,415 A | 6/1970 | McGrath et al. |
| 3,526,450 A | 9/1970 | Berry |
| 4,070,103 A | 1/1978 | Meeker |
| 4,620,778 A | 11/1986 | Bertolli |
| 4,798,455 A | 1/1989 | Yoe et al. |
| 4,806,008 A | 2/1989 | Tarloff |
| 4,828,355 A | 5/1989 | Lipson et al. |
| 4,877,320 A | 10/1989 | Holden |
| 4,878,749 A | 11/1989 | McGee |
| 4,950,066 A | 8/1990 | Hartman |
| 4,958,923 A * | 9/1990 | Rosenson ............ 351/52 |
| 4,981,350 A | 1/1991 | Vitaloni |
| 4,988,181 A | 1/1991 | Riach |
| 5,033,836 A | 7/1991 | Aoyama |
| 5,181,051 A | 1/1993 | Townsend et al. |
| 5,185,620 A | 2/1993 | Cooper |
| 5,371,554 A | 12/1994 | Aspesi |
| 5,416,537 A | 5/1995 | Sadler |
| 5,440,354 A | 8/1995 | Just |
| 5,497,211 A | 3/1996 | McNulty |
| 5,521,655 A | 5/1996 | Rhoad |
| 5,557,345 A | 9/1996 | Katzenmeyer et al. |
| 5,583,584 A | 12/1996 | Friedman |
| 5,636,787 A * | 6/1997 | Gowhari ............ 239/36 |
| 5,642,177 A | 6/1997 | Nishioka |
| 5,666,664 A | 9/1997 | Hamilton |
| 5,737,054 A | 4/1998 | Chao |
| 5,764,338 A | 6/1998 | Mack |
| 5,882,101 A | 3/1999 | Chao |
| 5,883,688 A | 3/1999 | Chao et al. |
| 5,912,718 A | 6/1999 | Murai et al. |
| 5,940,162 A | 8/1999 | Wong |
| 6,012,811 A | 1/2000 | Chao et al. |
| 6,092,896 A | 7/2000 | Chao et al. |
| 6,102,540 A | 8/2000 | Chen |
| 6,109,747 A | 8/2000 | Chao |
| 6,120,144 A | 9/2000 | Park |
| 6,149,269 A | 11/2000 | Madison |
| 6,170,948 B1 | 1/2001 | Chao |
| 6,170,949 B1 | 1/2001 | Mauch |
| RE37,545 E | 2/2002 | Chao |
| 6,367,926 B1 | 4/2002 | Chao et al. |
| 6,540,347 B1 | 4/2003 | Radziwon et al. |
| 6,568,804 B1 | 5/2003 | Lin |
| 6,783,238 B1 | 8/2004 | Stepper |
| 6,834,951 B2 | 12/2004 | Xie |
| 6,863,394 B1 | 3/2005 | Nelson et al. |
| 6,866,385 B2 | 3/2005 | Madison |
| 6,866,386 B1 | 3/2005 | Chen |
| 6,883,912 B1 | 4/2005 | Madison |
| 6,918,668 B2 | 7/2005 | Hsiao |
| 6,957,890 B2 | 10/2005 | Shapiro |
| 7,040,751 B2 | 5/2006 | Madison |
| 7,070,272 B1 | 7/2006 | Lu |
| 7,080,903 B2 | 7/2006 | Zelman |
| 7,140,728 B2 | 11/2006 | McKenna et al. |
| 7,144,108 B2 | 12/2006 | Lee |
| 7,175,275 B2 | 2/2007 | Ifergan |
| 7,198,364 B1 | 4/2007 | Chao |
| 7,226,161 B2 | 6/2007 | Chao et al. |
| 7,241,007 B2 | 7/2007 | Cody |
| 7,249,840 B1 | 7/2007 | Dobashi |
| 7,261,409 B1 | 8/2007 | Taber |
| 7,275,820 B2 | 10/2007 | Lee et al. |
| 7,278,731 B2 | 10/2007 | Madison |
| 7,318,440 B1 | 1/2008 | Grijalva |
| 7,328,999 B2 | 2/2008 | Zelman |
| 7,396,124 B1 | 7/2008 | Wang |
| 7,467,866 B2 | 12/2008 | Chao |
| 7,524,052 B2 | 4/2009 | Esses |
| 7,530,688 B2 | 5/2009 | Grogan et al. |
| 7,559,644 B1 | 7/2009 | Lloyd |
| 7,559,645 B2 | 7/2009 | Cohen |
| 7,585,069 B2 | 9/2009 | Wilson |
| 7,588,331 B2 * | 9/2009 | Burnstein ............ 351/51 |
| 7,600,870 B2 | 10/2009 | Zelazowski |
| 7,600,871 B2 | 10/2009 | Lane et al. |
| 7,677,721 B2 | 3/2010 | Siu |
| 7,771,044 B2 | 8/2010 | Madison |
| 7,794,080 B2 | 9/2010 | Zelazowski |
| 7,850,301 B2 | 12/2010 | DiChiara |
| 7,874,669 B2 | 1/2011 | Moritz et al. |
| 8,123,351 B2 | 2/2012 | Moritz et al. |
| 2002/0170147 A1 | 11/2002 | Heller |
| 2005/0248720 A1 | 11/2005 | Ng |
| 2006/0023158 A1 | 2/2006 | Howell et al. |
| 2006/0187404 A1 | 8/2006 | Ifergan |
| 2006/0250571 A1 | 11/2006 | Li |
| 2007/0013863 A1 | 1/2007 | Zelazowski |
| 2007/0046887 A1 | 3/2007 | Howell et al. |
| 2007/0222940 A1 | 9/2007 | Cohen |
| 2007/0242211 A1 | 10/2007 | Chao |
| 2007/0273823 A1 | 11/2007 | Lee et al. |
| 2008/0036961 A1 | 2/2008 | Zhou |
| 2008/0117381 A1 | 5/2008 | Chen |
| 2008/0165317 A1 | 7/2008 | Wilson |
| 2008/0239232 A1 | 10/2008 | Guerrero |
| 2008/0259269 A1 * | 10/2008 | Grogan et al. ............ 351/52 |
| 2008/0273162 A1 | 11/2008 | Porter |
| 2008/0284974 A1 | 11/2008 | Siu |
| 2009/0096982 A1 | 4/2009 | Heim |
| 2009/0122253 A1 | 5/2009 | Clay |
| 2009/0135369 A1 | 5/2009 | Burnstein |
| 2009/0147213 A1 | 6/2009 | Poole |
| 2009/0180070 A1 | 7/2009 | Poole |
| 2010/0002186 A1 | 1/2010 | Zelman |
| 2012/0224135 A1 | 9/2012 | Moritz et al. |

FOREIGN PATENT DOCUMENTS

| | | |
|---|---|---|
| FR | 1160007 | 7/1958 |
| FR | 2547430 | 5/1984 |
| FR | 2897168 | 8/2007 |
| GB | 846425 | 8/1960 |
| WO | WO 2007/068808 | 6/2007 |
| WO | WO 2008/082718 | 7/2008 |

OTHER PUBLICATIONS

"Fashionable Eyewear Charms to add Color, Style & Fun to Eyeglass Frames". Ficklets—Eyewear Charm Huggers. http://www.ficklets.com. Jul. 22, 2009.

* cited by examiner

EYEGLASS WITH INTERCHANGEABLE ORNAMENTATION

CROSS-REFERENCE TO RELATED APPLICATIONS

This application claims the benefit of U.S. Provisional Application No. 61/248,401, filed Oct. 2, 2009, the entirety of which is incorporated herein by reference.

BACKGROUND

1. Field of the Inventions

The present inventions relate generally to decorative ornamentation systems for eyewear. More specifically, the present inventions relate to methods and apparatuses for interchanging ornamental magnetic components on an eyeglass frame.

2. Description of the Related Art

The eyewear industry has developed countless eyeglass designs. Some of these designs provide not only optical performance, but also additional functionality. Fashion trends in eyewear have drifted in recent years from leaner, wiry versions to those that are larger, wider, and often more highly decorated with ornamentation.

In addition to the designer trend, sport and casual eyewear has also begun incorporating additional functionality and gadgetry. For example, many eyewear products now provide on-board electronics that provide Bluetooth or MP3 functionality.

Notwithstanding the foregoing, there remains a need for a releasable attachment system that enables the easy attachment and release of secondary components to an underlying eyeglass frame.

SUMMARY

The present application discloses various new mechanisms, eyewear products, pairing tools, and methods that will further revolutionize the eyewear industry. For example, implementations of some of the embodiments disclosed herein enable a wearer to personally customize and manipulate their eyeglasses with any of a variety of selected eyewear components, such as ornamental emblems and structures, to name a few.

Presently in the eyewear industry, a consumer may select preassembled eyeglasses having any of a variety of designs, colors, components, or other features. While this provides a pseudo customized final product, the eyeglasses typically cannot be further manipulated or modified after delivery to the consumer. One exception is the eyeglass that allows the consumer to remove and replace the frame, earstems, lenses and/or nosepiece of the eyeglasses. Nevertheless, there is a need in the art for a modular system that enables eyeglasses to be further uniquely and/or repeatedly modified based on the wearer's preference. Further, in some embodiments disclosed herein, a system is provided in which the engagement or attraction between a decorative component and a retention element of an earstem or frame of an eyeglass can be maximized when the decorative component is in an engaged position on the eyeglass in order to prevent accident or unintentional dislodgement of the decorative component.

In accordance with an embodiment, an eyeglass component mounting system is provided that comprises an eyeglass and a decorative component. The eyeglass can comprise a frame and at least one earstem attached to the frame. The earstem can comprise a retention zone or engagement section. Further, the decorative component can be fitted onto or into the earstem with the decorative component being engaged in the retention zone or engagement section of the earstem.

The retention zone can extend along at least a portion of the earstem. In some embodiments, the retention zone can be configured such that the decorative component can move along the earstem between a disengaged position and an engaged position in which the decorative component is secured to the earstem. For example, the decorative component can move along a path that is oriented parallel or transverse relative to the longitudinal axis of earstem.

In some embodiments, the retention zone can comprise at least one recess in the earstem. The recess can have a first end and a second end. For example, the recess can extend in a vertical direction and be configured to receive the decorative component therein, such as by a sliding interconnection. The decorative component can be moved from a disengaged position in which the decorative component is not secured to the earstem to an engaged position at which removal of the decorative component requires considerable deliberate force. Thus, when in the engaged position, the decorative component would not tend to be dislodged by incidental or accidental contact.

The decorative component can be received into or onto the retention zone or engagement section of the earstem. In some embodiments, the decorative component may be fitted over and/or into the earstem. Further, the decorative component can be positioned into a slot, recess, or cavity of the earstem.

In some embodiments, at least a portion of the decorative component can be received within a recess of the retention zone of the earstem. In the engaged position, the decorative component can be fully seated in the recess of the engagement section. For example, in the engaged position, an external profile of the decorative component can be generally flush with an external profile of the at least one earstem.

The decorative component can be engaged with the earstem in a manner that enables at least a portion of the decorative component to be visible. For example, a decorative element on a lateral side of the earstem can be visible.

In some embodiments, the retention zone or engagement section can comprise a retention element. The retention zone can comprise a magnetic area or a magnetic element or component. However, the retention element can also comprise a protrusion or recess that corresponds to a recess or protrusion of the decorative component. In some embodiments, the retention element can be disposed in a distal portion of the retention zone or engagement section. However, the retention element can be disposed in a proximal portion of the retention zone or engagement section.

In some embodiments, the decorative component can have an engagement element that engages or couples with the retention element of the retention zone to secure the decorative component relative to the earstem. In some embodiments, the decorative component may comprise a magnetic portion that can be paired with a magnetic element or area of the earstem. The decorative component can be retained in the retention zone or engagement section of the earstem upon attraction between the magnetic area of the earstem and the magnetic portion of the decorative component.

The engagement element of the decorative component can be disposed along the body of the decorative component such that engagement element and the retention element engage, couple, or attract to each other only when the decorative component is fully fitted onto or into the retention zone.

For example, if the retention element is disposed at a distal portion of the retention zone, the engagement element can be disposed at a distal portion of the decorative component. Likewise, if the retention element is disposed at a proximal portion of the retention zone, the engagement element can be disposed at a proximal portion of the decorative component.

Accordingly, in some embodiments, the decorative component can be moved between the disengaged and the engaged positions and achieve the engaged position when the decorative component is properly and fully seated or fitted onto or into the earstem. Further, in the engaged position, the maximum engagement, coupling, or attraction can be exerted or in force between the engagement element and the retention element.

In some embodiments, the decorative component can comprise a body and at least one elongate flange extending from the body. Further, the decorative component can comprise a pair of flanges extending from a body thereof such that the decorative component comprises a U-shaped configuration. For example, the decorative component can be configured to comprise an inner flange and an outer flange and a space disposed therebetween, and the retention zone of the earstem can be received into the space between the inner flange and the outer flange. Further, an outer or lateral flange thereof can comprise a decorative element.

In some embodiments, an elongate flange of the decorative component can comprise a magnetically-attractable material, such as iron and the like. The elongate flange can comprise a magnetic material or a magnetized material.

For example, the retention element of the retention zone can be magnetic and can exert a magnetic attraction on the decorative component. Further, a magnetic attraction between the magnetic retention element and the decorative component can be greatest when the decorative component is in the engaged position. For example, in some embodiments, the body of the retention component can be positioned on the earstem in a disengaged position in which the at least one elongate flange is disposed in a proximal portion of the engagement section such that a magnetic retention element of the retention zone does not retain or attract the flange of the decorative component into or toward the retention zone or engagement section. The body can also be positioned on the earstem in an engaged position in which the at least one elongate flange is disposed in a distal portion of the engagement section such that the magnetic retention element exerts an attractive force on the decorative component to magnetically retain the flange in the distal portion of the engagement section during use theoreof.

Further, the magnetic area of the retention zone may comprise a south pole or a north pole of at least one magnet or an adjacent south and north poles of at least two magnets facing in a lateral or medial direction.

Further, the system can be configured such that the decorative component defines a lateral or exterior surface and the earstem defines a lateral or exterior surface. The decorative component can be configured such that adjacent portions of the lateral or exterior surfaces of the decorative component and the earstem are generally flush when the decorative component is received in the retention zone of the earstem. Furthermore, the decorative component can comprise a pair of flanges that extend generally parallel to define a clip. The clip can be attachable to the retention zone of the earstem with distal ends of the flanges of the clip being seated against respective retention portions of the retention zone of the earstem for releasably retaining the decorative component at the retention zone of the earstem. The clip of the decorative component can create a snap fit with the retention portions of the retention zone of the earstem.

The system can further comprise an array of two or three or four or more decorative components that are interchangeable with each other and mountable on the earstem of the eyeglass.

In accordance with some embodiments, a decorative eyeglass kit is also provided. The kit can comprise a plurality of decorative components that can each be removably attached to a retention zone of an earstem of an eyeglass with at least a portion of the decorative component fitting onto the retention zone of the earstem. The decorative component can comprise a magnetic portion that can be coupled with a complementary magnetic area of the retention zone of the earstem such that the decorative component is seated onto the earstem. The decorative component can be retained by the retention zone of the earstem upon attraction between the magnetic area of the earstem and the magnetic portion of the decorative component.

Further, the decorative components can each comprising a body and at least one elongate flange extending from the body. The body can be positionable on the earstem in a disengaged position in which the at least one elongate flange is separated from the retention zone such that the magnetic portion does not retain the flange on the earstem. The body can also be positionable on the earstem in an engaged position in which the at least one elongate flange is disposed adjacent to the retention zone such that the magnetic portion exerts an attractive force on the decorative component to magnetically retain the decorative component in the engaged position during use. Furthermore, the retention zone can comprise a recess configured to slidably receive the decorative components in an interchangeable manner. The retention zone can be disposed in a distal portion of the recess.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

While the present description sets forth specific details of various embodiments, it will be appreciated that the description is illustrative only and should not be construed in any way as limiting. Additionally, it is contemplated that although particular embodiments of the present inventions may be disclosed or shown in the context of unitary or dual lens eyewear systems, such embodiments can be used in both unitary and dual lens eyewear systems. Further, it is contemplated that although particular embodiments of the present inventions may be disclosed or shown in the context of frames having full orbitals, such embodiments can be used with frames having both full and partial orbitals or rimless frames. Furthermore, various applications of such embodiments and modifications thereto, which may occur to those who are skilled in the art, are also encompassed by the general concepts described herein.

Moreover, although the present description may set forth examples of embodiments incorporating certain aesthetic or functional components, the present inventions contemplate the use of any type of present or future decorative or functional (e.g. electronic) components with eyeglasses. Further, the interchangeability and customization of embodiments can be permanent or temporary. Furthermore, one or more components can be attached to visible or hidden portions of the eyeglass. For example, a component may be attached to either the inner (medial) or outer (lateral) face of an earstem or frame of the eyeglasses.

As noted above, various eyewear designs have been provided to suit the needs and preferences of consumers. However, according to at least one of the embodiments disclosed herein is the realization that an eyewear product can be provided that enables a wearer to selectively modify or personalize their eyeglasses to comprise any variety of decorative and/or electronic components. Further, in accordance with another of the embodiments disclosed herein is the realization that a wearer should preferably be able to easily modify their eyeglasses and obtain desirable results.

In this regard, it is contemplated that any aesthetic or functional modifications to the eyeglasses preferably do not affect the stability or optical quality of the eyeglasses. For example, a component preferably is not only easily incorporated into the eyeglass, but is preferably securely retained by the eyeglass. Therefore, in order to address such concerns, as well as other disadvantages of the prior art, the present application sets forth various embodiments and disclosure relating to a customizable eyeglass that allows a wearer to modify at least one aesthetic and/or functional quality thereof while maintaining superior performance and fit of the eyeglass.

For example, some embodiments disclosed herein provide an eyeglass comprising a frame and an earstem attached to the frame. In some embodiments, the earstem can be hingedly attached to the frame. Further, at least one of the frame and the earstem can be configured to receive a component. The component can be a decorative component or a functional component, such as an electronic component. In this regard, a first component can be removed and replaced with a second component by the wearer of the eyeglasses in order to customize or personalize the eyeglasses.

In some embodiments, a wearer can remove and replace ornamental features of the eyeglass. In some implementations, the wearer can remove and replace minor or major parts of the earstem. For example, the wearer can remove and replace discrete decorative emblems disposed along one or more of the earstems of the eyeglass. In another example, the wearer can remove and replace a length or portion of the earstem. The length or portion can be a visible or hidden portion of the eyeglasses. The wearer can thereby make minor or major modifications to the eyeglasses to customize the eyeglasses. In this manner, the wearer is given the ability to change the appearance and character of their eyeglasses, as they desire.

In yet other embodiments, a uniquely configured eyeglass is provided that enables one or more ornamental or electronic components to be removably mounted onto one or more sections of the eyeglass. The eyeglass can comprise a frame, a pair of earstems, and one or more attachment portions, engagement sections or retention zones of that can be used to secure a component onto the eyeglass. The attachment portion can be stationary or movable relative to the eyeglass. The attachment portion can be disposed on the frame or the earstems of the eyeglass.

In some embodiments, the attachment portion, engagement section, or retention zone can comprise a backbone element which extends along the length of at least the engagement section or retention zone and may extend the length of the earstem. The backbone element can be configured such that one or more components or earstem portions can be mounted thereon. In some embodiments, the backbone element can be a narrowed portion of the earstem.

For example, the backbone element can be coupled to the front frame at an anterior end thereof and carry an ear support at a posterior zone or end thereof. One or more portions of the earstem can be mounted on the backbone element. In such an embodiment, additional components can be mounted onto the backbone element. For example, the additional components can be snapped into place on the backbone element. Further, the additional components can be magnetically retained by the backbone element.

In another embodiment, a component can be initially seated onto the backbone element for mounting thereon. The backbone element can comprise one or more engagement structures, such as protrusions, recesses or grooves, which can interact with corresponding engagement structures of the component when the component is initially seated onto the backbone element in order to retain the component thereon. Thus, the component can be securely mounted on the earstem when the eyeglasses are worn. A mechanical interfit structure can be used in combination with a magnetic retention system.

Figure 1:
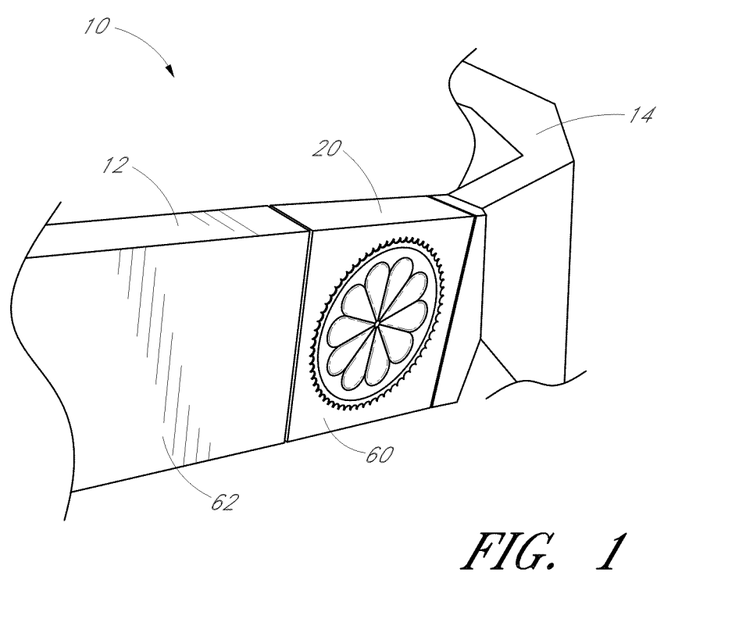
FIG. 1 is a perspective view of an earstem of an eyeglass illustrating a decorative component in an engaged position, in accordance with an embodiment of the present inventions.

Referring now to the figures, wherein embodiments are shown for purposes of illustrating features of the present inventions, and not for limiting the same, FIG. 1 illustrates an embodiment of an eyeglass 10 prepared in accordance with an aspect of the present inventions. The eyeglass 10 can comprise at least a first earstem 12 and a frame 14 to which the earstem 12 can be pivotably or immovably attached. The embodiment of the eyeglass 10 illustrated in FIG. 1 can also comprise a decorative component 20. As shown in FIG. 1, the decorative component 20 is a fully seated or mounted onto the earstem 12. Thus, the decorative component 20 is in an engaged position.

Figure 2:
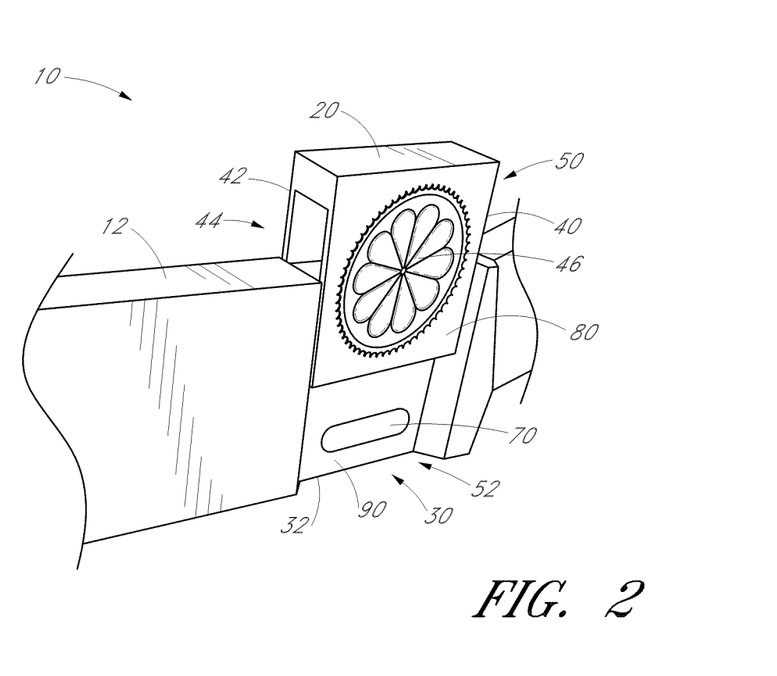
FIG. 2 is a perspective view of the eyeglass shown in FIG. 1, wherein the decorative component is in a partially disengaged position, in accordance with an embodiment.
Figure 3:
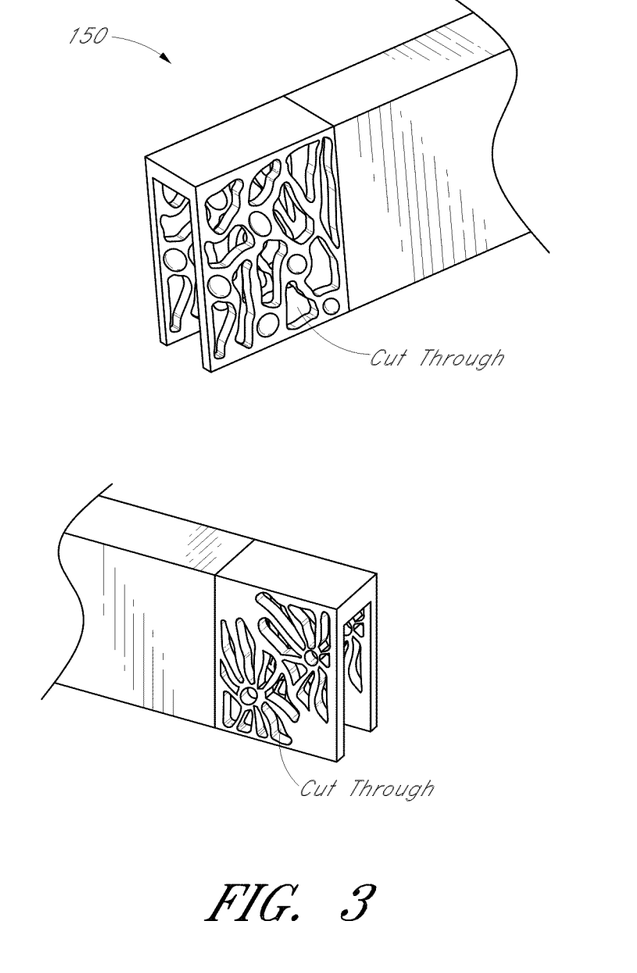
FIG. 3 is a perspective view of embodiments of an earstem of an eyeglass illustrating decorative components in an engaged position.
Figure 4:
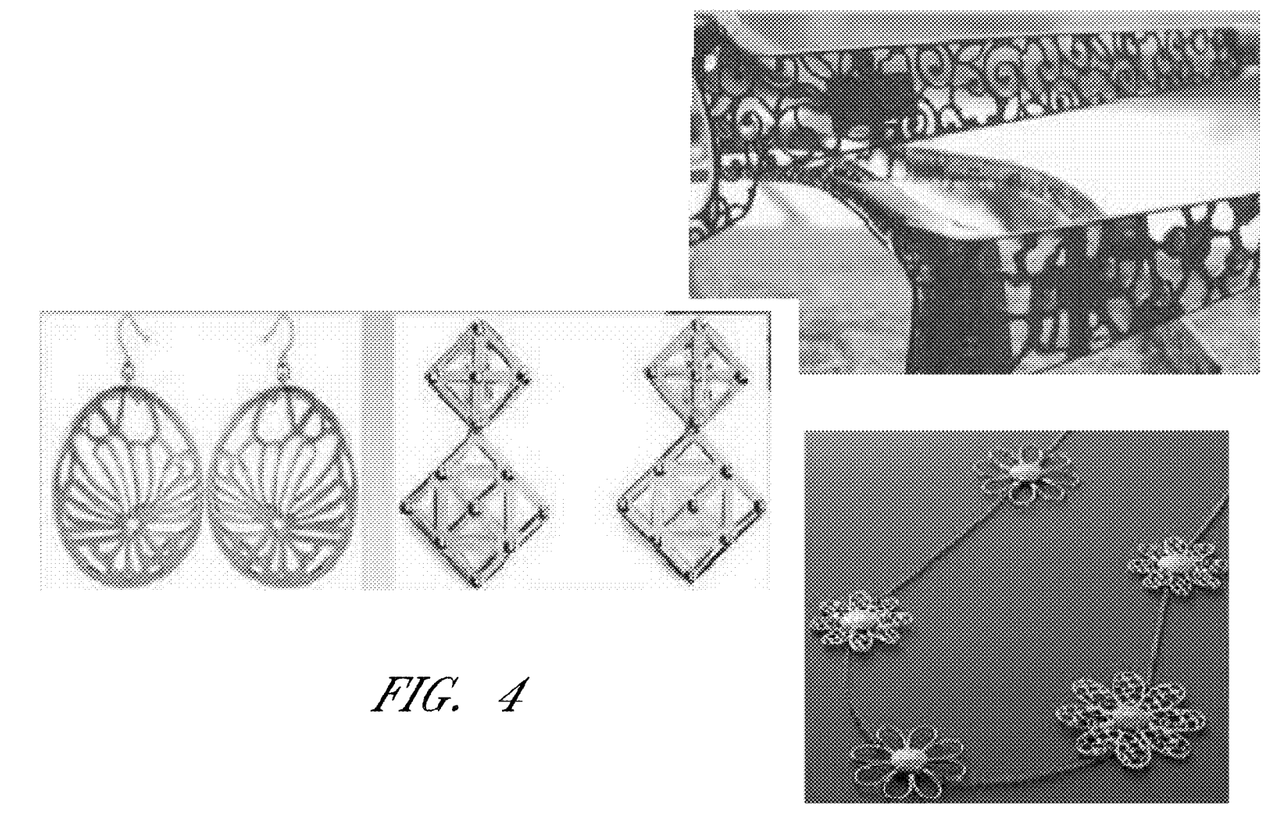
FIG. 4 illustrates a variety of designs for decorative components that can be used in combination with the embodiments illustrated FIG. 3, along with complementary articles of jewelry.
Figure 5:
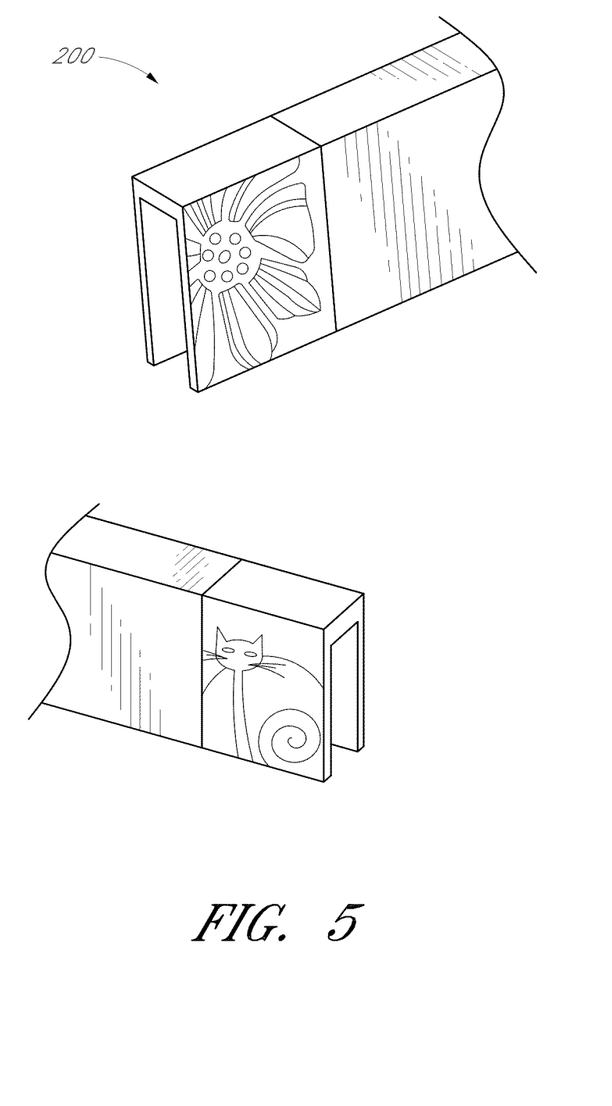
FIG. 5 is a perspective view of other embodiments of an earstem of an eyeglass illustrating decorative components in an engaged position.
Figure 6:
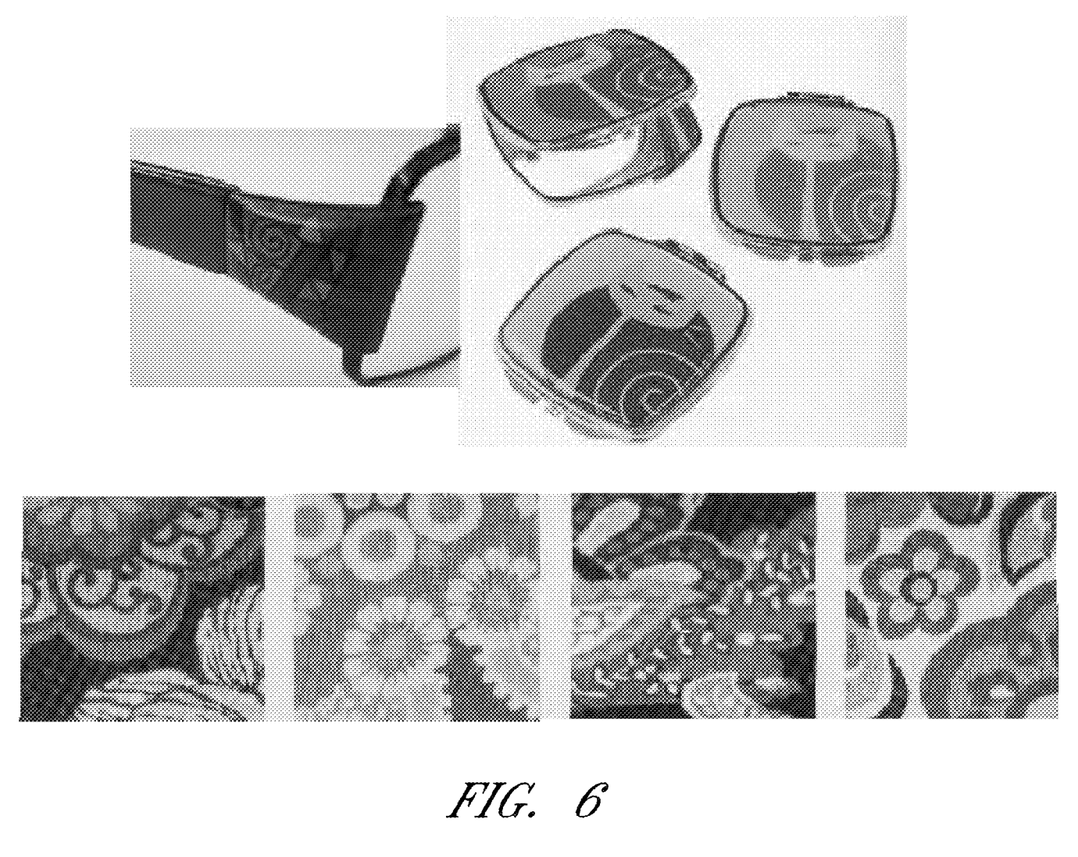
FIG. 6 illustrates a variety of designs for decorative components that can be used in combination with the embodiments illustrated FIG. 5.
Figures 7, 8:
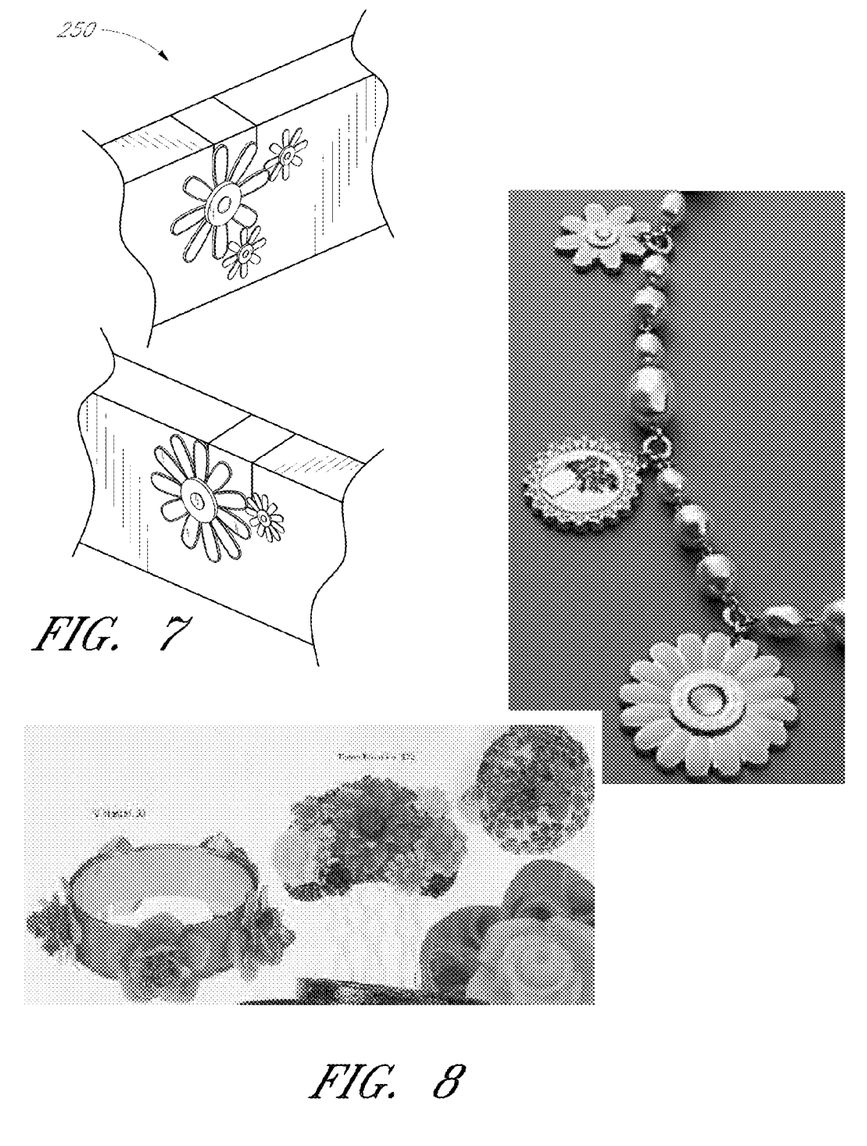
FIG. 7 is a perspective view of additional embodiments of an earstem of an eyeglass illustrating decorative components in an engaged position.
FIG. 8 illustrates a variety of designs for decorative components that can be used as matching or complementary articles of jewelry to be worn as a set with a decorative eyewear of the present invention.
Figure 9:
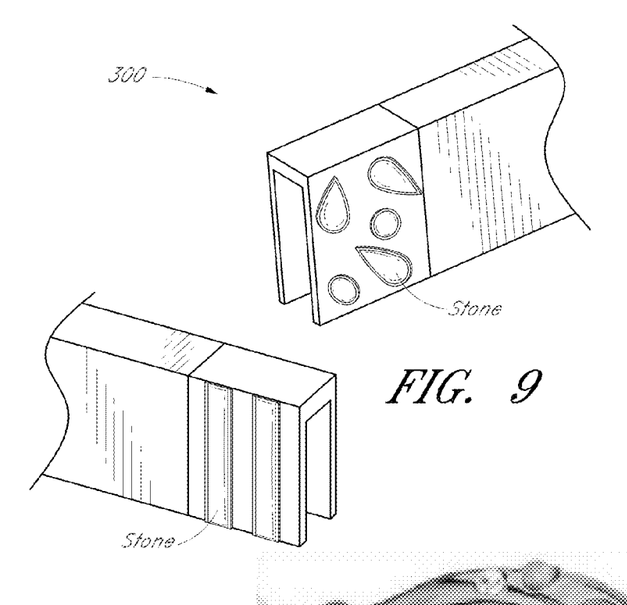
FIG. 9 is a perspective view of further embodiments of an earstem of an eyeglass illustrating decorative components in an engaged position.
Figure 10:
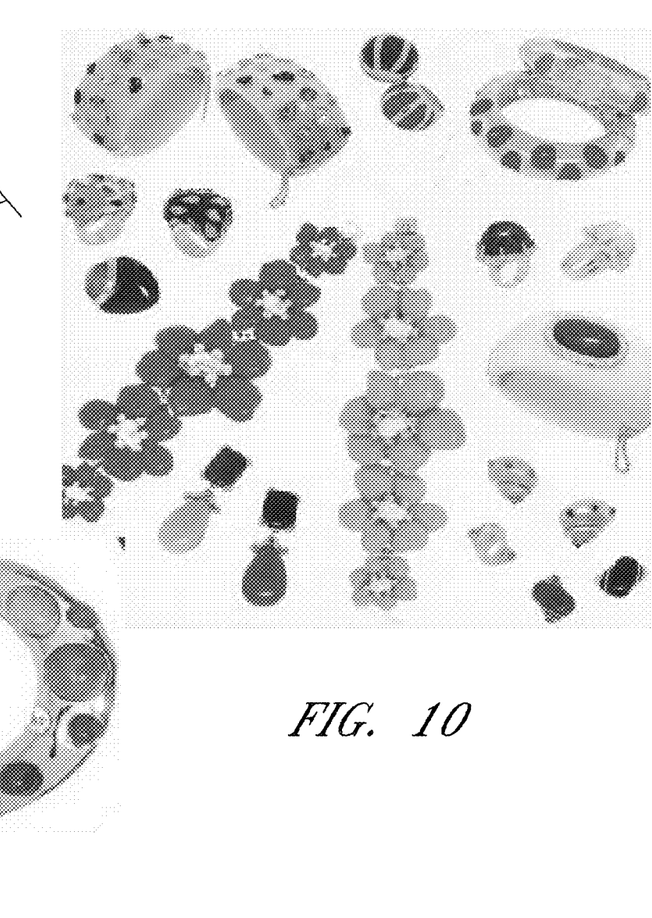
FIG. 10 illustrates a variety of designs for decorative components that can be used in combination with the embodiments illustrated FIG. 9.
Figures 11, 12:
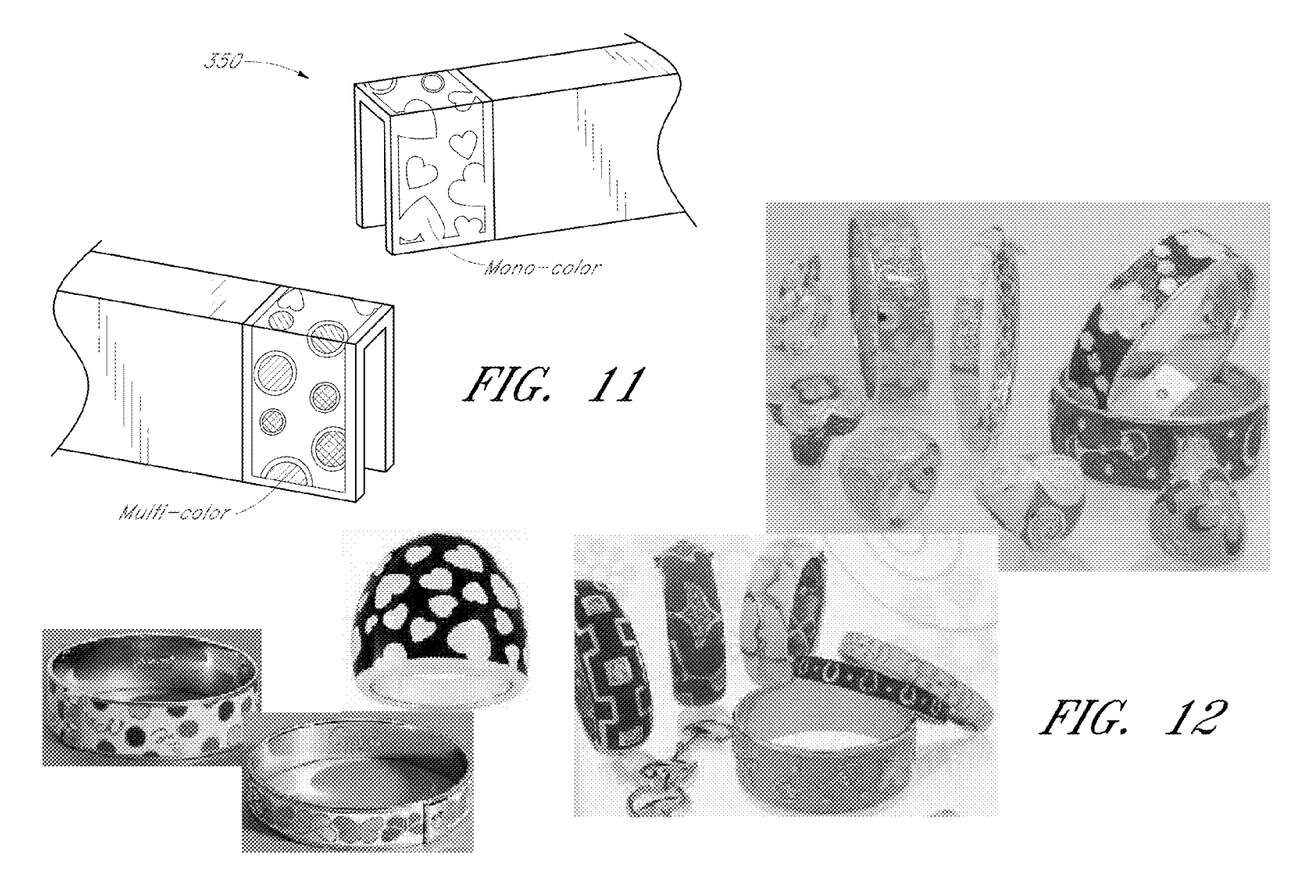
FIG. 11 is a perspective view of yet additional embodiments of an earstem of an eyeglass illustrating decorative components in an engaged position.
FIG. 12 illustrates a variety of designs for decorative components that can be used in combination with the embodiments illustrated FIG. 11.
Figure 13:
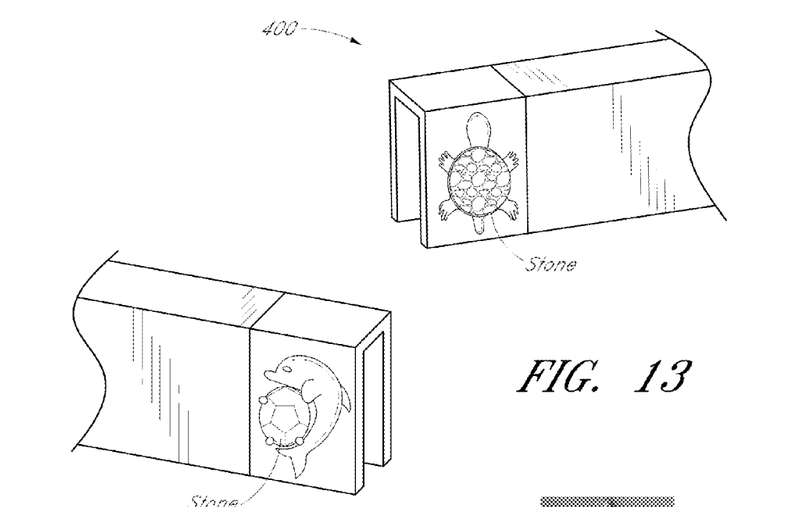
FIG. 13 is a perspective view of yet further embodiments of an earstem of an eyeglass illustrating decorative components in an engaged position.
Figure 14:
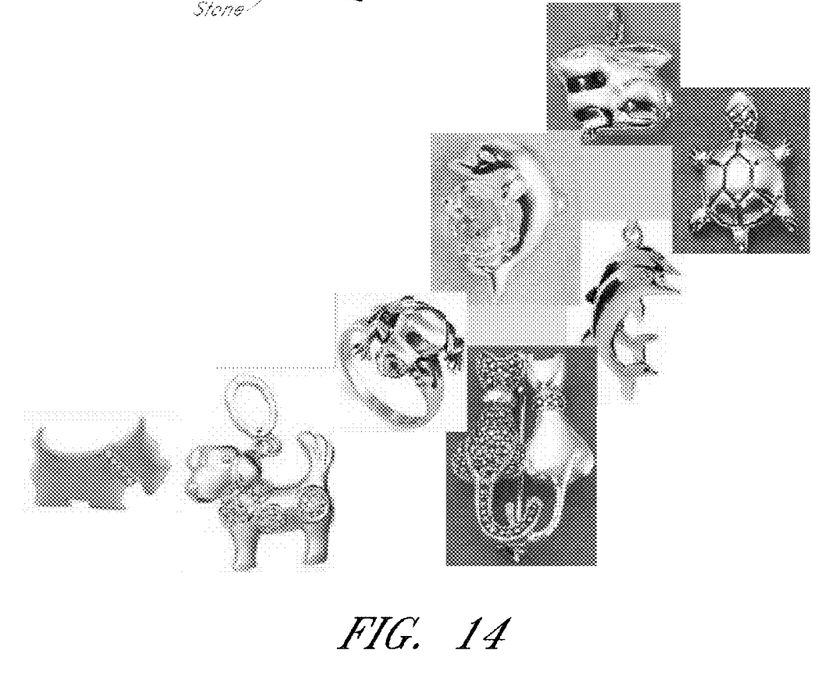
FIG. 14 illustrates a variety of designs for decorative components that can be used in combination with the embodiments illustrated FIG. 13.

FIG. 2 illustrates the eyeglass 10 shown in FIG. 1 wherein the decorative component 20 is in a disengaged position. As illustrated, the earstem 12 can comprise an engagement section or retention zone 30 configured such that the decorative component 20 can move along the earstem 12 in a direction transverse to the longitudinal axis of earstem 12. In some embodiments, the engagement section or retention zone 30 can comprise at least one indentation or recess 32 in the earstem 12.

In the illustrated embodiment of FIGS. 1 and 2, the decorative component 20 is receivable in the retention zone 30 of earstem 12. The decorative component 20 can be moved between the disengaged position and an engaged position. The engagement between the decorative component 20 and the retention zone 30 can be maximized when the decorative component 20 is in the engaged position.

The decorative component 20 can comprise an outer or lateral or first flange 40 and an inner or medial or second flange 42. The first and second flanges 40, 42 can extend generally parallel to each other and define a space 44 therebetween. Further, as illustrated, the outer flange 40 can comprise a decorative element 46.

In use, the decorative component 20 can be fitted onto the earstem 12 such that a backbone element or portion of the earstem 12 is received into the space 44 of the decorative component 20. In this regard, the decorative component 20 can be fitted over the earstem 12, for example, along the width of the earstem 12. For example, the zone 30 of the earstem 12 can define a first end and 50 and a second end 52. The system can thus be configured such that the decorative component 20 is receivable into the retention zone 30 by advancing from the first end 50 of the retention zone 30 towards the second end 52. For example, the first end 50 can be at the top of the earstem and the second end 52 can be at the bottom of the earstem or in between the top and bottom of the earstem.

Accordingly, in such embodiments, the decorative component 20 can cover the earstem 12 along the entire vertical height thereof. This can have various aesthetic benefits. For example, one of the unique advantages of embodiments disclosed herein is that the decorative component 20 can be configured to have a seamless and integrated appearance with the adjacent surface of the earstem. In this regard, the decorative component 20 can define a lateral or exterior surface 60 and the earstem 12 can define a lateral or exterior surface 62. Thus, as shown in FIG. 1, the decorative component 20 can be configured such that adjacent portions of the lateral or exterior surfaces 60, 62 of the decorative component 20 and the earstem 12 are generally flush when the decorative component 20 is received in the retention zone 30 of the earstem 12.

Accordingly, the decorative component 20 will not give the appearance as an inferior or cheap interchangeable component on the eyeglass 10. Instead, the decorative component 20 will impart a high-quality look and appearance to the eyeglass that is original and unique, such that an ordinary observer would believe that the eyeglass is a new or different pair each time the decorative component 20 of a first design is replaced by another decorative component of a second design. Indeed, embodiments disclosed herein provide for a high-quality and aesthetically superior eyeglass system.

For some embodiments, the retention zone 30 can be configured to comprise a retention element. For example, the retention element can comprise a magnetic area or element 70. The magnetic area 70 can extend at least partially along the width of the earstem 12. For example, as shown in FIG. 2, the magnetic area 70 can be disposed at the second end 52 of the retention zone 30. However, it is contemplated that the magnetic area 70 can extend along the entire width of the earstem 12 or be disposed at the first end 50 of the retention zone 30 or in between.

In accordance with an embodiment, it is contemplated that the decorative component 20 can further comprise a complementary magnetic portion 80 that can be magnetically coupled with the magnetic area 70 of the earstem 12. The locations of the complementary magnetic area 70 and the magnetic portion 80 can cause the decorative component 20 to be drawn onto the earstem 12 and into the retention zone 30. As such, the replacement and attachment of decorative components can be greatly facilitated through the magnetic positional inclination created by such a design. Thus, the decorative component 20 can be retained in the retention zone 30 of the earstem 12 upon attraction between the magnetic area 70 of the earstem 12 and the magnetic portion 80 of the decorative component 20.

In some implementations, the magnetic area 70 can be configured to comprise a magnet. Alternatively, the magnetic area 70 can comprise a ferrous material that is magnetically attracted to a magnet. Similarly, in some implementations, the magnetic portion 80 of the decorative component 20 can comprise a magnet. Alternatively, the magnetic portion 80 can comprise a ferrous material that is magnetically attracted to a magnet. The combination of the magnetic area 70 and the magnetic portion 80 in a given eyeglass system can be configured such that one or both of the magnetic area 70 and the magnetic portion 80 comprises a magnet. For example, in an embodiment, the earstem 12 can comprise a magnet and the decorative component 20 can comprise a ferrous material that is magnetically attracted to the magnet of the earstem 12.

In embodiments using a magnet, it is contemplated that the magnet can comprise neodymium or samarium cobalt, although other ferrite magnets can also be used. In yet further embodiments, magnets other than ferrite magnets can also be used. Magnet pairs are preferably aligned such that a north pole of a first magnet is located such that it pairs with a south pole of a second magnet to bias the decorative component into a fully seated orientation on the earstem.

In accordance with yet other embodiments, the first and second flanges 40, 42 of the decorative component 20 can extend generally parallel to each other to define a clip. The clip can be attachable to the retention zone 30 of the earstem 12 with distal ends of the flanges 40, 42 of the clip being seated against one or more retention sections 90 of the retention zone 30 of the earstem 12 for releasably retaining the decorative component 20 at the retention zone 30 of the earstem 12. In this regard, the clip of the decorative component 20 can create a snap fit with the retention section 90 of the retention zone 30 of the earstem 12. The retention section 90 is illustrated in FIG. 2 and can comprise an indentation or protrusion that can engage a portion of the distal end of the first or second flanges 40, 42. The engagement between the retention section 90 and the portion of the first or second flanges 40, 42 can secure the decorative component 20 to the retention zone 30.

In accordance with another embodiment, a decorative eyeglass kit is provided that can comprise a plurality of decorative components. For example, FIGS. 3, 5, 7, 9, 11, and 13 each illustrate various designs that can be incorporated into embodiments of a decorative element 150, 200, 250, 300, 350, and 400. FIGS. 4, 6, 8, 10, 12, and 14 all illustrate various designs and decorative features that can be incorporated into the respective decorative elements of the figures.

Accordingly, the decorative eyeglass kit can comprise one or more styles or designs of decorative components that can be configured to be freely interchangeable on a given eyeglass. Thus, the wearer can purchase a set of decorative components that can fit onto the eyeglass of the wearer. In some implementations, the decorative components can have a given size, such as small, medium, and large. The small decorative component can be interchanged onto an eyeglass having a small-size retention zone. Further, the large decorative component can be interchanged onto an eyeglass having a large-size engagement section or retention zone. As such, the various sizes and designs above the decorative components can be marketed to correspond to given eyeglass configurations while allowing complete interchangeability at the wearer's discretion. This unique advantage allows the wearer to customize the appearance and expression of their eyeglass while providing convenient, secure, and an attractive mechanical interconnection between components of the kit and the eyeglass.

Additionally, the embodiments of the decorative components 150, 200, 250, 300, 350, and 400 can be configured to be reversible. In other words, each decorative component can be attached to an earstem in a first orientation such that a first side of the decorative component is shown. However, the decorative component can be reversed or rotated such that a second side of the decorative component can be shown. As such, the first and second sides of the decorative component can each provide a different design, as shown in FIGS. 3, 5, 7, 9, 11, and 13. This unique feature of reversibility is unknown or aspect that provides distinct advantages over prior art systems. As such, the reversibility allows a wearer to purchase a single set of decorative components that provide two styles or looks that can be reversed for interchanged as desired by the wearer.

Further, as also illustrated in some of the figures, the decorative components can have a cut through design. In this regard, it is contemplated that the cut through design can reveal a color, pattern, or other aspect of the earstem set behind the cut through design of the decorative component. In this regard, other features can be incorporated into such designs, such as allowing for the interchangeability of color templates, photos, or other images that can allow the wearer to stylize the eyeglass as desired. The cut through design of the decorative components can serve to frame or complement such images.

The decorative earstem component of the present invention may be paired or associated with other articles of jewelry or clothing, to produce a matched set. For example, a first design for a decorative component on an eyeglass may be associated with a bracelet, wristwatch, ring, earring, broach, pin, or other article having a similar or complementary design. The wearer may therefore select a decorative component for the eyeglass along with a ring, pendant, bracelet or other article to produce a matched set. The same eyeglasses may thereafter be utilized with a second decorative component, and a second set of corresponding articles as will be appreciated in view of the disclosure herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An eyeglass component mounting system comprising:
an eyeglass frame;
a pair of earstems extending posteriorly relative to the frame, at least one of the earstems comprising an engagement section, the engagement section having a magnetic retention element disposed therein, the engagement section extending at least partially along the at least one earstem; and
at least one decorative component comprising a body and first and second elongate flanges extending from the body, the body positionable on the at least one earstem in a disengaged position in which the first and second elongate flanges are disposed in first portions of the engagement section such that the magnetic retention element does not retain the decorative component in the engagement section, the body further being positionable on the at least one earstem in first and second engaged positions in which the first and second elongate flanges are disposed in second portions of the engagement section such that the magnetic retention element exerts an attractive force on the decorative component to retain the first and second flanges in the second portions of the engagement section during use theoreof, wherein the decorative component is movable from the disengaged position to the first and second engaged positions in a direction that extends from a top portion of the at least one earstem to a bottom portion of the at least one earstem such that the decorative component is reversible, wherein in the first engaged position the first flange is configured to form an exterior surface of the at least one earstem facing away from a head of a wearer and the second flange is configured to form an interior surface of the at least one earstem facing towards the head of the wearer, wherein in the second engaged position the second flange is configured to form the exterior surface of the at least one earstem facing away from the head of a wearer and the first flange is configured to form the interior surface of the at least one earstem facing towards the head of the wearer, and wherein in the first and second engaged positions the first and second flanges are generally flush with respective surfaces of the at least one earstem.

2. The eyeglass component mounting system of claim 1, wherein the elongate flange comprises a magnetically-attractable material.

3. The eyeglass component mounting system of claim 2, wherein the elongate flange comprises a magnetic material.

4. The eyeglass component mounting system of claim 1, wherein the magnetic retention element is disposed on a top surface of the engagement section.

5. The eyeglass component mounting system of claim 1, wherein magnetic attraction between the magnetic retention element and the decorative component is greatest when the decorative component is in the engaged position.

6. The eyeglass component mounting system of claim 1, wherein the first and second flanges extend from the body such that the decorative component comprises a U-shaped configuration.

7. The eyeglass component mounting system of claim 1, wherein in the first and second engaged positions, an external profile of the decorative component is generally flush with an external profile of the at least one earstem.

8. The eyeglass component mounting system of claim 7, wherein the engagement section comprises a recess wherein the decorative component is seated in the first and second engaged positions.

9. An eyeglass component mounting system comprising:
an eyeglass comprising a frame and at least one earstem attached to the frame, the earstem comprising a retention zone, the retention zone comprising a retention element, the retention zone extending along at least a portion of the earstem; and
a decorative component being receivable in the retention zone of the earstem, wherein the decorative component comprises an inner flange and an outer flange and a space disposed therebetween, the retention zone of the earstem configured to be received into the space between the inner flange and the outer flange such that the decorative component is positionable onto the earstem with the decorative component being engaged with the retention element of the retention zone of the earstem, wherein the decorative component is configured to be selectively positionable onto the earstem in first and second engaged positions, wherein in the first engaged position the outer flange is configured to form an exterior surface of the earstem facing away from a head of a wearer when the eyeglass is worn, and wherein in the second engaged position the inner flange is configured to form the exterior surface of the earstem facing away from the head of the wearer when the eyeglass is worn, such that the decorative component is reversible and wherein the earstem maintains generally the same external profile in the first and second engaged positions.

10. The eyeglass component mounting system of claim 9, wherein the retention zone comprises at least one recess in the earstem.

11. The eyeglass component mounting system of claim 10, wherein at least a portion of the decorative component is received within the recess of the retention zone of the earstem.

12. The eyeglass component mounting system of claim 9, wherein the retention element is disposed on a lateral side of the earstem.

13. The eyeglass component mounting system of claim 9, wherein the retention element is a magnet.

14. The eyeglass component mounting system of claim 9 wherein the retention element comprises a magnet and the decorative component comprises a magnetic portion that can be paired with the magnet of the retention element, the decorative component being retained in the retention zone of the earstem upon attraction between the magnet of the retention element and the magnetic portion of the decorative component.

15. The eyeglass component mounting system of claim 9, wherein a clip of the decorative component creates a snap fit with the retention portions of the retention zone of the earstem.

16. The eyeglass component mounting system of claim 9, wherein the retention element is disposed on a top surface of the earstem and configured to engage with the space between the inner flange and outer flange of the decorative component when the decorative component is positioned onto the earstem.

17. A decorative eyeglass kit comprising a plurality of decorative components each being removably attachable to a retention zone of an earstem of an eyeglass with at least a portion of the decorative component fitting onto the retention zone of the earstem, the decorative component comprising a magnetic portion that can be coupled with a complementary magnetic area of the retention zone of the earstem such that the decorative component is seated onto the earstem, the decorative component is retained by the retention zone of the earstem upon attraction between the magnetic area of the earstem and the magnetic portion of the decorative component, wherein the decorative component comprises a disengaged position in which the decorative component is separated from the retention zone such that the magnetic portion does not retain the decorative component on the earstem and first and second engaged positions in which the decorative component is disposed adjacent to the retention zone such that the magnetic portion exerts an attractive force on the decorative component to magnetically retain the decorative component on the earstem, the decorative component configured to move from the disengaged position to the first and second engaged positions in a direction that extends from a top portion of the earstem to a bottom portion of the earstem, the decorative component configured to be reversible such that in the first engaged position a first surface of the decorative component is configured to form an exterior surface of the earstem facing away from a head of a wearer and a second surface of the decorative component is configured to form an interior surface of the earstem facing towards the head of the wearer, wherein in the second engaged position the second surface is configured to form the exterior surface of the earstem facing away from the head of a wearer and the first surface is configured to form the interior surface of the earstem facing towards the head of the wearer, and wherein in the first and second engaged positions the first and second surfaces of the decorative component are generally flush with respective surfaces of the earstem.

18. The kit of claim 17, wherein the decorative components each comprise a body and at least one elongate flange extending from the body, the body being positionable on the earstem in a disengaged position in which the at least one elongate flange is separated from the retention zone such that the magnetic portion does not retain the flange on the earstem, the body further being positionable on the earstem in an engaged position in which the at least one elongate flange is disposed adjacent to the retention zone such that the magnetic portion exerts an attractive force on the decorative component to magnetically retain the decorative component in the engaged position during use.

19. The kit of claim 18, wherein the retention zone comprises a recess configured to slidably receive the decorative components in an interchangeable manner.

20. The kit of claim 19, wherein the retention zone is disposed in a top portion of the recess.

* * * * *